(12) United States Patent
Mizuguchi et al.

(10) Patent No.: US 10,629,885 B2
(45) Date of Patent: Apr. 21, 2020

(54) ELECTRIC STORAGE DEVICE

(71) Applicant: Murata Manufacturing Co., Ltd., Nagaokakyo-shi, Kyoto-fu (JP)

(72) Inventors: Yuji Mizuguchi, Nagaokakyo (JP); Retsu Tahara, Nagaokakyo (JP); Hirotaka Maeyoshi, Nagaokakyo (JP); Keisuke Shimada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/157,416

(22) Filed: Oct. 11, 2018

(65) Prior Publication Data

US 2019/0044122 A1    Feb. 7, 2019

Related U.S. Application Data

(63) Continuation of application No. PCT/JP2017/005427, filed on Feb. 15, 2017.

(30) Foreign Application Priority Data

May 31, 2016    (JP) ................... 2016-108296

(51) Int. Cl.
*H01M 2/00*    (2006.01)
*H01M 2/26*    (2006.01)
(Continued)

(52) U.S. Cl.
CPC ............ *H01M 2/266* (2013.01); *H01G 11/12* (2013.01); *H01G 11/26* (2013.01); *H01G 11/52* (2013.01);
(Continued)

(58) Field of Classification Search
CPC ....... H01G 11/26; H01G 11/74; H01M 2/026; H01M 2/266; H01M 10/0585; H01M 2/02
See application file for complete search history.

(56) References Cited

U.S. PATENT DOCUMENTS 8,450,595 B2    5/2013  Harada et al.
2004/0038122 A1  2/2004  Hisamitsu et al.
(Continued)

FOREIGN PATENT DOCUMENTS

JP    2001093576 A    4/2001
JP    2002329493 A    11/2002
(Continued)

OTHER PUBLICATIONS

International Search Report issued for PCT/JP2017/005427, dated Apr. 4, 2017.
(Continued)

*Primary Examiner* — Cynthia H Kelly
*Assistant Examiner* — Monique M Wills
(74) *Attorney, Agent, or Firm* — Arent Fox LLP (57) ABSTRACT

A case includes first and second opposed main surfaces and a side surface extending between the first and second main surfaces. An electrode body is housed in the case and including a first electrode, a second electrode, and a separator disposed between the first and second electrodes. First and second terminals are located on the side wall of the case. A first lead is electrically connected with the first electrode and extends from a side surface of the electrode body. A second lead is electrically connected with the second electrode and extends from the side surface of the electrode body. First and second connection members electrically connect the first and second leads to the first and second terminals, respectively. Each of the connection members
(Continued)

includes a first part extending along the side surface of the case and a second part extending along the second main surface of the case.

13 Claims, 7 Drawing Sheets

(51) Int. Cl.
*H01M 2/30* (2006.01)
*H01G 11/12* (2013.01)
*H01M 2/18* (2006.01)
*H01M 10/04* (2006.01)
*H01G 11/82* (2013.01)
*H01M 2/02* (2006.01)
*H01G 11/76* (2013.01)
*H01G 11/26* (2013.01)
*H01G 11/52* (2013.01)
*H01G 11/74* (2013.01)
*H01G 11/78* (2013.01)
*H01M 10/0585* (2010.01)

(52) U.S. Cl.
CPC .............. *H01G 11/74* (2013.01); *H01G 11/76* (2013.01); *H01G 11/78* (2013.01); *H01G 11/82* (2013.01); *H01M 2/02* (2013.01); *H01M 2/021* (2013.01); *H01M 2/026* (2013.01); *H01M 2/0217* (2013.01); *H01M 2/0285* (2013.01); *H01M 2/18* (2013.01); *H01M 2/30* (2013.01); *H01M 10/04* (2013.01); *H01M 10/0436* (2013.01); *H01M 10/0585* (2013.01)

(56) References Cited

U.S. PATENT DOCUMENTS

| | | |
|---|---|---|
| 2009/0186270 A1 | 7/2009 | Harada et al. |
| 2010/0239902 A1 | 9/2010 | Hisamitsu et al. |
| 2010/0263201 A1 | 10/2010 | Hisamitsu et al. |
| 2012/0135283 A1* | 5/2012 | Lee ................. H01M 2/1061 429/82 |
| 2012/0244423 A1 | 9/2012 | Kusukawa et al. |
| 2014/0295220 A1* | 10/2014 | Mori ................. H01M 2/12 429/53 |
| 2015/0079460 A1* | 3/2015 | Byun ................. H01M 2/0262 429/178 |
| 2015/0372353 A1 | 12/2015 | Baek et al. |
| 2016/0006420 A1 | 1/2016 | Lin |
| 2016/0351864 A1* | 12/2016 | Yoon ................. H01M 10/0413 |

FOREIGN PATENT DOCUMENTS

| | | |
|---|---|---|
| JP | 2004087260 A | 3/2004 |
| JP | 2009176513 A | 8/2009 |
| JP | 2011070918 A | 4/2011 |
| JP | 2011076786 A | 4/2011 |
| JP | 2012199162 A | 10/2012 |
| JP | 2013016523 A | 1/2013 |
| JP | 2014032937 A | 2/2014 |
| JP | 2015146252 A | 8/2015 |
| JP | 2016506606 A | 3/2016 |

OTHER PUBLICATIONS

Written Opinion of the International Searching Authority issued for PCT/JP2017/005427, dated Apr. 4, 2017.

* cited by examiner

ELECTRIC STORAGE DEVICE

CROSS REFERENCE TO RELATED APPLICATIONS

The present application is a continuation of International application No. PCT/JP2017/005427, filed Feb. 15, 2017, which claims priority to Japanese Patent Application No. 2016-108296, filed May 31, 2016, the entire contents of each of which are incorporated herein by reference.

TECHNICAL FIELD

The present invention relates to an electric storage device.

BACKGROUND OF THE INVENTION

Conventionally, electric storage devices have been used as power sources for various types of electronic devices. For example, Japanese Patent Application Laid-open No. 2015-146252 ("Patent Document 1") discloses an exemplary electric storage device. In the electric storage apparatus disclosed in Patent Document 1, an electrode tab extended from a side surface of a laminated body obtained by laminating a positive electrode, a separator, and a negative electrode is provided on the side surface of the laminated body and extends along the thickness direction.

Large capacity is required for an electric storage device.

It is a main purpose of the present invention to provide a large-capacity electric storage device.

BRIEF DESCRIPTION OF THE INVENTION

In accordance with one aspect of the invention, an electric storage device comprises:

(a) a case including first and second opposed main surfaces and a side surface extending between the first and second main surfaces;

(b) an electrode body housed in the case and including a first electrode, a second electrode, and a separator disposed between the first and second electrodes;

(c) first and second terminals located on the side wall of the case;

(d) a first lead electrically connected with the first electrode and extending from a side surface of the electrode body;

(e) a second lead electrically connected with the second electrode and extending from the side surface of the electrode body;

(f) a first connection member including:

(i) a conductive first part having a proximal end which is electrically connected to the first terminal and a distal end which is located closer to the second main wall than the first terminal, the first part extending along the side wall; and (ii) a conductive second part extending along the second main surface and having a proximal end electrically connected to the distal end of the first part and a distal end electrically connected to the first lead; and (g) a second connection member including:

(i) a conductive third part having a proximal end which is electrically connected to the second terminal and a distal end which is located closer to the second main wall than the second terminal, the third part extending along the side wall; and (ii) a conductive fourth part extending along the second main surface and having a proximal end electrically connected to the distal end of the third part and a distal end electrically connected to the second lead.

In a preferred embodiment, the case has a rectangular shape including a cutout part as viewed along a plane running parallel to the first main surface of the case.

In a preferred embodiment, a portion of the side surface forms the cut out portion and at least one of the first and second terminals is provided on the portion of the side surface which forms the cutout part.

The case may be made of a conductive material and at least one insulation member is disposed between the case and at least one of the first and second connection members.

In a preferred embodiment, the first electrode, the second electrode, and the separator are integrated in the electrode body and the electrode body and the case are joined together.

In a preferred embodiment, a bonding layer bonds the electrode body to the case.

In a preferred embodiment at least one of the first and second electrode terminals are formed as part of the case.

In preferred embodiments, the first and second connection members are elongated conductors which extend perpendicular to one another. The first and second elongaged conductors extend along the side surface and the second main surface of the case, respectively.

In some embodiments, the electrode body comprises a plurality of sets of electrode pairs, each set of electrode pairs including respective first and second electrodes separated by a respective separator. Each of the first electrodes is electrically connected to a respective first lead and each of the second electrodes is electrically connected to a respective second lead, each of the first leads being electrically connected to the first terminal, each of the second leads being electrically connected to the second terminal.

In a preferred embodiment, each of the first leads is electrically connected to the first terminal via the first connection member and each of the second leads is electrically connected to the second terminal via the second connection member.

The present invention provides a large-capacity electric storage device.

MODE FOR CARRYING OUT THE INVENTION

Exemplary preferred embodiments of the present invention will be described below. The following embodiments are merely exemplary. The present invention is not limited thereto.

In drawings referred to in the embodiments and the like, components having effectively identical functions will be denoted by an identical reference signs. The drawings referred to in the embodiments and the like are schematically illustrated. For example, the dimensional ratios of objects illustrated in the drawings are different from the dimensional ratio of objects in reality in some cases. For example, the dimensional ratios of objects are also different between the drawings in some cases. For example, specific dimensional ratios of objects should be determined based on the following description.

First Embodiment

An electric storage device 1 illustrated in FIGS. 1 to 4 includes an electrolyte 4 (see FIG. 3) such as electrolytic solution. Specifically, the electric storage device 1 may be, for example, a battery such as a secondary battery, or a capacitor such as an electric double-layer capacitor.

Figure 1:
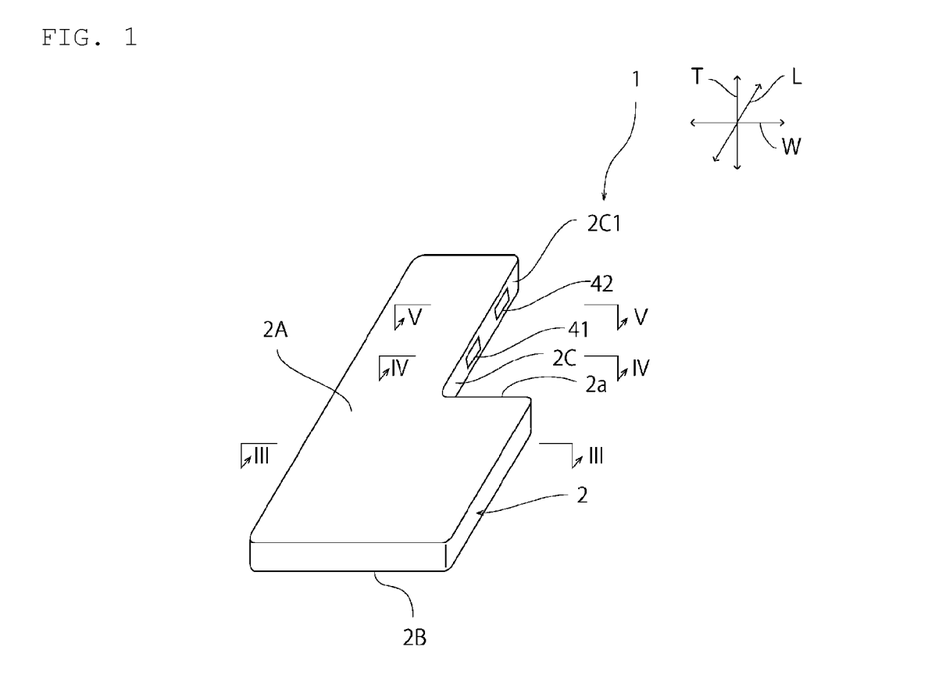
FIG. 1 is a schematic perspective view of an electric storage device according to a first embodiment.
Figure 2:
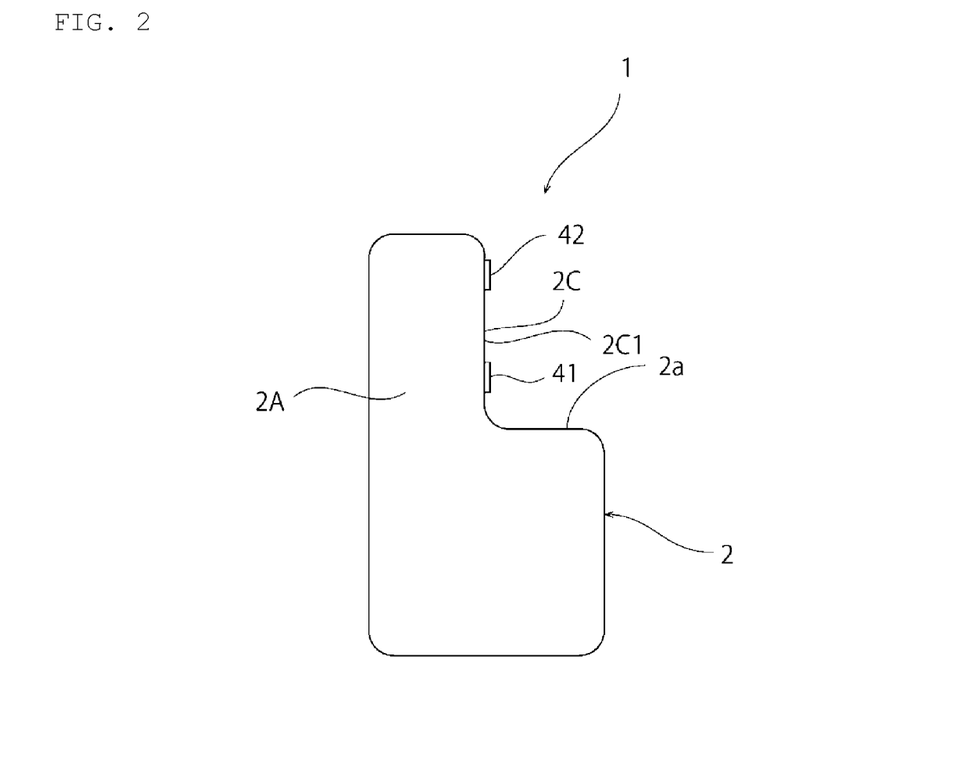
FIG. 2 is a schematic plan view of the electric storage device according to the first embodiment.
Figure 3:
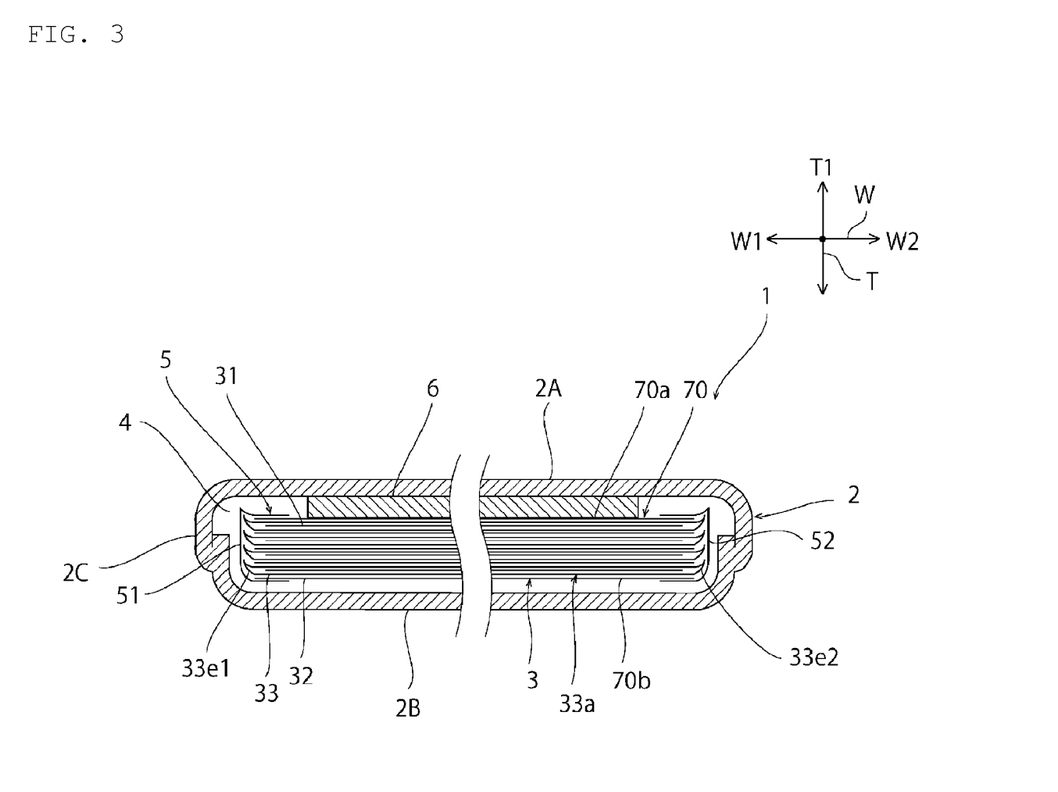
FIG. 3 is a schematic cross-sectional view taken along line in FIG. 1.

As illustrated in FIGS. 1 to 3, the electric storage device 1 includes a case 2 having a rectangular shape including a cutout part 2a having a substantially rectangular shape in plan view. Reference herein to a "rectangular shape including a cutout part" includes a rectangular shape including a cutout part and rounded corners.

The case 2 includes opposing first and second main wall parts 2A and 2B and a side wall part 2C connecting the first and second main wall parts 2A and 2B.

In the electric storage device 1, the cutout part 2a has a substantially rectangular shape in plan view. Specifically, the single cutout part 2a having a substantially rectangular shape in plan view and including rounded corners is provided. However, the present invention is not limited to this configuration. For example, the case may be provided with a plurality of cutout parts. For example, a cutout part may be provided at each of a plurality of corners of the case. The shape of the cutout part provided to the case is also not limited. The cutout part may have, for example, an arcuate shape, a polygonal shape, or a combination thereof.

The case 2 may be made of a conductor or an insulator. The case 2 may be made of, for example, metal such as aluminum, stainless steel, or copper, or resin.

As illustrated in FIG. 3, an electrode body 3 is disposed inside the case 2. The electrode body 3 includes a plurality of positive electrodes 31, a plurality of negative electrodes 32, and a plurality of separators 33. Each respective adjacent pairs of positive and negative electrodes 31 and 32 face each other with a respective separator 33 interposed there between in a thickness direction T. The separator 33 insulates the adjacent positive and negative electrodes 31 and 32 from one another. In the present embodiment, side edges of adjacent separators 33 are connected with each other. Each such pair of two adjacent separators 33 form a respective separator 33a in a bag shape. A respective positive electrode 31 is disposed in each bag-shaped separator 33a. However, while this is preferred, it is not required. In the present invention, a respective sheet separate separator may be provided between each pair of adjacent positive and negative electrodes.

In the present embodiment, the positive electrode 31 corresponds to a "first electrode", and the negative electrode 32 corresponds to a "second electrode".

In the present embodiment, each of the positive and negative electrodes 31 and 32 and each of the separators 33 take the form of a flat sheet. The flat sheets of the positive and negative electrodes 31 and 32 and the flat sheets of the separators 33 are laminated together to form a laminated electrode body 3. However, the present invention is not so limited. The electrode body is not particularly limited as long as the electrode body has a configuration that allows accumulation of electrical power (charge). For example, the electrode body may be formed by a wound body obtained by winding a lamination sheet back and forth in a serpentine manner such that the a positive electrode, a separator, and a negative electrode are laminated in the stated order a multiple number of times.

The configuration of the positive electrode 31 may be determined as appropriate in accordance with the kind of the electric storage device 1. For example, when the electric storage device 1 is a secondary battery, each of the positive electrodes 31 may include a positive electrode collector and an active material layer provided on at least one surface of the positive electrode collector. For example, when the electric storage device 1 is an electric double-layer capacitor, each of the positive electrodes 31 may include a positive electrode collector and a polarizable electrode layer provided on at least one surface of the positive electrode collector.

The configuration of the negative electrodes 32 may also be determined as appropriate in accordance with the kind of the electric storage device 1. For example, when the electric storage device 1 is a secondary battery, the negative electrode 32 may include a negative electrode collector, and an active material layer provided on at least one surface of the negative electrode collector. For example, when the electric storage device 1 is an electric double-layer capacitor, each of the negative electrodes 32 may include a negative electrode collector and a polarizable electrode layer provided on at least one surface of the negative electrode collector.

The separators 33 may be formed, for example, by a porous sheet including open cells through which ions in an electrolyte are movable. The separators 33 may be made of, for example, polypropylene, polyethylene, polyimide, cellulose, aramid, polyvinylidene fluoride, or Teflon (registered trademark). The separators 33 may have a surface covered by a ceramic court layer or a bonding layer. The surface of the separators 33 may have a bonding property. The separators 33 may be a single-layer film made of one kind of material, or may be a composite film or multi-layered film made of one or two or more types of material.

In place of the separators 33 or in addition to the separators 33, an insulation layer such as a ceramic coat layer may be provided on the surface of each of the positive and negative electrodes 31 and 32.

An undercoat layer containing, for example, carbon may be provided between the collector and the active material layer on each of the positive and negative electrodes.

In the electric storage device 1, the laminated body of the positive electrode 31, the separator 33, and the negative electrode 32 is integrated. In other words, the electrode body 3 is integrated. Specifically, in the present embodiment, a plurality of sets of electrode pairs comprising a positive electrode 31, a separator 33, and a negative electrode 32 are laminated together in the stated order to form a laminated body 70. The integrated electrode body 3 is formed by the combination of the laminated body 70 and a pair of insulation tapes 51 and 52 (if desired a single insulation tape 5 can be used) which integrates the electrode body 3. The insulation tapes 51 and 52 are provided to cover respective side surfaces of the laminated body 70 thereby integrating the laminated body 70.

The first insulation tape 51 is provided on a W1 side of the laminated body 70 and extends from the lower (as viewed in FIG. 3) or first main surface 70b of the laminated body 70 across the left ends of the separators 33 and onto the upper (as viewed in FIG. 3) or second main surface 70*a* of the laminated body 70. As a result, at least a leading end part of a first end part 33*e*1 of each of the separators 33 are held so that they are bent upwardly as viewed in FIG. 3 (i.e., they are bent to the T1 side in the thickness direction T).

The second insulation tape 52 is provided on a W2 side of the laminated body 7070 and extends from the lower (as viewed in FIG. 3) or first main surface 70*b* of the laminated body 70 across the right ends of the separators 33 and onto the upper (as viewed in FIG. 3) or second main surface 70*a* of the laminated body 70. As a result, at least a leading end part of a first end part 33*e*2 of each of the separators 33 are held so that they are bent upwardly as viewed in FIG. 3 (i.e., they are bent to the T1 side in the thickness direction T). As a result, all of the opposite ends of the separators 33 are bend in the same direction.

The method of joining the insulation tapes 51 and 52 with the laminated body 70 is not particularly limited. For example, the insulation tapes 51 and 52 may be joined with the laminated body 70 directly or by adhesive bonding using an adhesive bonding agent. The insulation tapes 51 and 52 may be formed of adhesive bonding tapes and bonded to the laminated body 70. The insulation tapes 51 and 52 may be formed of double-sided adhesive bonding tapes and bonded to the laminated body 70, and the laminated body 70 may be bonded and fixed to the case 2 through the insulation tapes 51 and 52. This configuration effectively reduces displacement of the laminated body 70 in the case 2. Alternatively, the insulation tapes 51 and 52 and the laminated body 70 may be fixed together by using an adhesive bonding tape different from the insulation tapes 51 and 52.

"Adhesive bonding" includes "adhesion" and "bonding". Thus, an adhesive bonding agent includes an adhesive agent and a bonding agent. An adhesive bonding tape includes an adhesive tape and a bonding tape.

The insulation tape 5 may be, for example, a tape made of resin such as polyimide, polypropylene, or acrylic, or metal foil such as aluminum foil, copper foil, stainless steel foil, or nickel foil, the surface of which is coated with an insulation layer.

The electrode body 3 may be integrated by bonding each positive electrode 31 and its corresponding separator 33 through a bonding agent and by bonding each negative electrode 32 and its corresponding separator 33 through a bonding agent.

The electrode body 3 and the case 2 are joined together. Specifically, as illustrated in FIG. 3, the electrode body 3 is bonded and fixed to an inner surface of the case 2 through a bonding layer 6. In FIG. 3, the electrode body 3 is joined on the upper side (T1 side) to the case 2, but may instead (or in addition) be joined to the case on the lower side.

Figure 4:
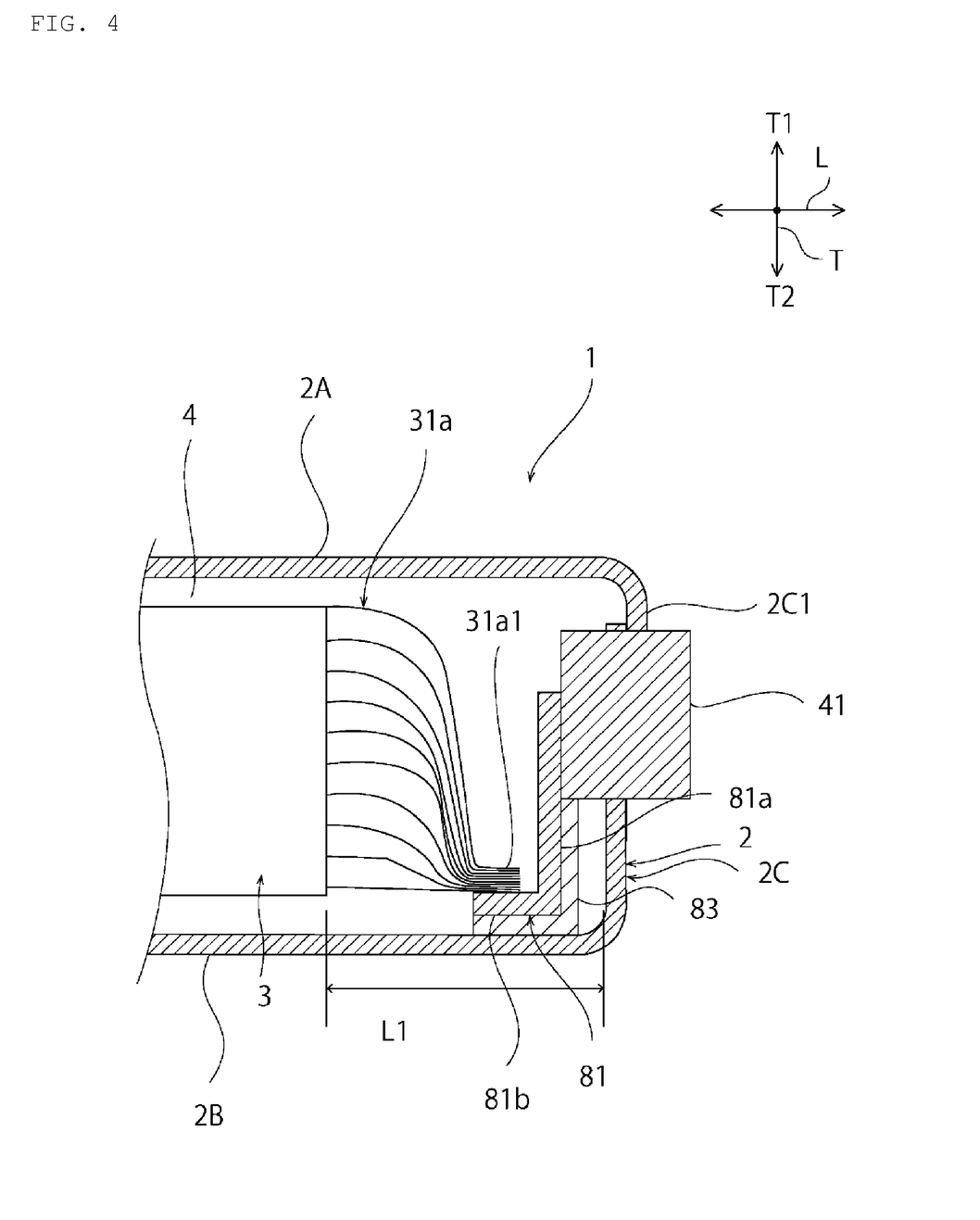
FIG. 4 is a schematic cross-sectional view taken along line IV-IV in FIG. 1.

As illustrated in FIG. 4, a respective first lead 31*a* is connected with each of the plurality of positive electrodes 31 and is extended from a side surface of the electrode body 3. A respective second lead 32*a* is connected with each of the plurality of negative electrodes 32 and is extended from the side surface of the electrode body 3.

As illustrated in FIGS. 1 and 2, a positive electrode terminal (first terminal) 41 is provided on the side wall part 2C of the case 2. Specifically, the positive electrode terminal 41 is provided to a side wall part 2C1 forming the cutout part 2*a* at the side wall part 2C of the case 2. As illustrated in FIG. 4, the positive electrode terminal 41 is electrically connected with the plurality of first leads 31*a*. Specifically, the positive electrode terminal 41 is connected with a leading end part 31*a*1 of the plurality of bundled first leads 31*a* with a first connection member 81 interposed there between. A first connection member 81 includes a first part 81*a* extending from the positive electrode terminal 41 toward the second main wall part 2B along the side wall part 2C, and a second part 81*b* connected with the first part 81*a* and extending from a leading end of the first part 81*a* on a side closer to the second main wall part 2B toward the electrode body 3 along the second main wall part 2B. The leading end part of the plurality of bundled first leads 31*a* is connected with the second part 81*b* of the first connection member 81.

The first connection member 81 and the case 2 are insulated from each other through an insulation member 83. When the inner surface of the case 2 is insulative or when the case 2 and the first connection member 81 are equipotential, the insulation member 83 does not necessarily need to be provided.

As illustrated in FIGS. 1 and 2, a negative electrode terminal (second terminal) 42 is provided on the side wall part 2C of the case 2. Specifically, the negative electrode terminal 42 is provided to the side wall part 2C1 forming the cutout part 2*a* at the side wall part 2C of the case 2. The present embodiment describes an example in which the positive electrode terminal 41 and the negative electrode terminal 42 are both provided at the side wall part 2C1. However, the present invention is not so limited. The case may have a rectangular parallelepiped shape and one of the first and second terminals may be provided on the side surface of the case which forms the cutout part.

Figure 5:
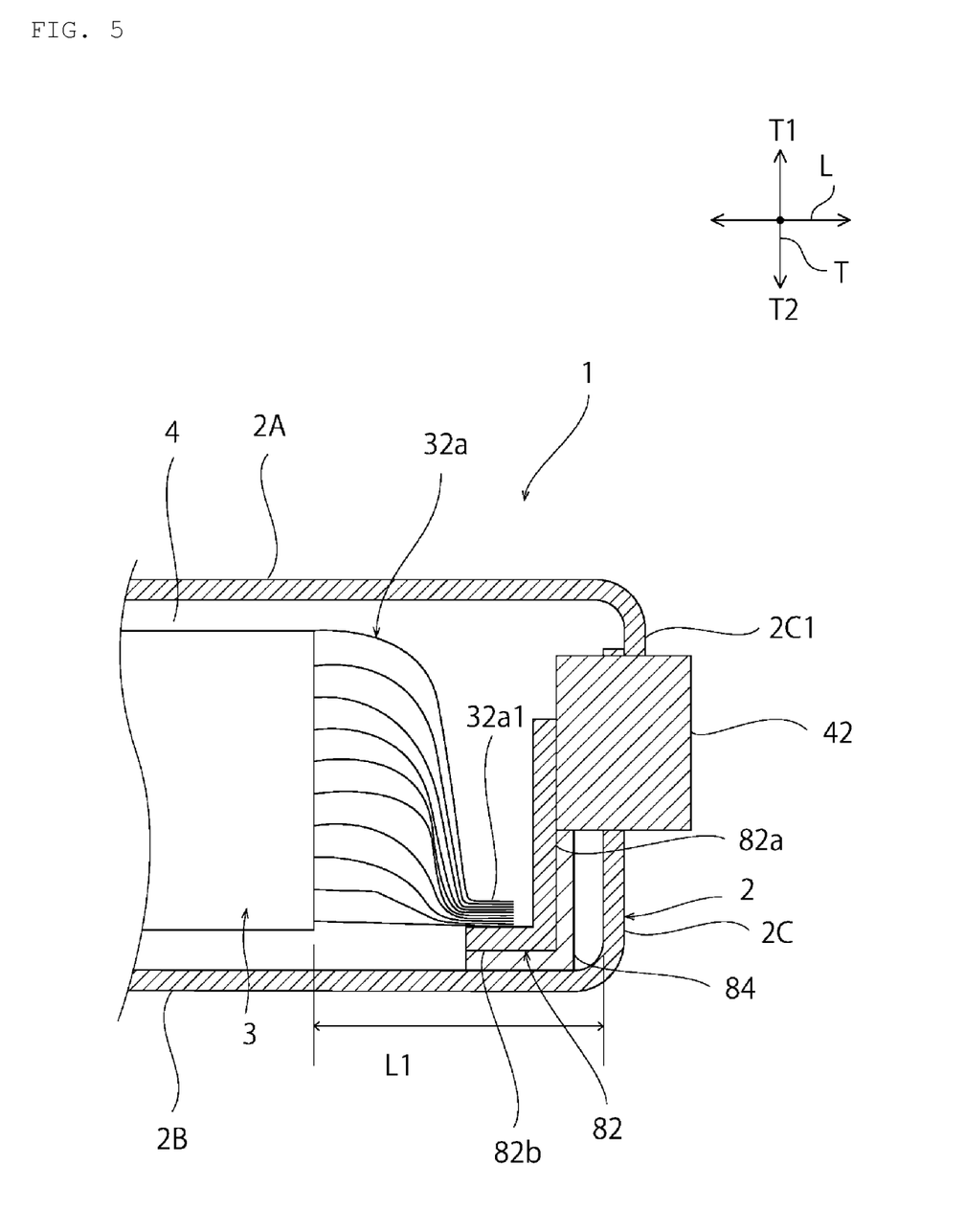
FIG. 5 is a schematic cross-sectional view taken along line V-V in FIG. 1.

As illustrated in FIG. 5, the negative electrode terminal 42 is electrically connected with the plurality of second leads 32*a*. Specifically, the negative electrode terminal 42 is connected with a leading end part 32*a*1 of the plurality of bundled second leads 32*a* with a second connection member 82 interposed there between. The second connection member 82 includes a third part 82*a* extending from the negative electrode terminal 42 toward the second main wall part 2B along the side wall part 2C, and a fourth part 82*b* connected with the third part 82*a* and extending from a leading end of the third part 82*a* on a side closer to the second main wall part 2B toward the electrode body 3 along the second main wall part 2B. The leading end part of the plurality of bundled second leads 32*a* is connected with a second part 82*b* of the second connection member 82.

The second connection member 82 and the case 2 are insulated from each other through an insulation member 84. When the inner surface of the case 2 is insulative or when the case 2 and the second connection member 82 are equipotential, the insulation member 84 does not necessarily need to be provided.

Figure 6:
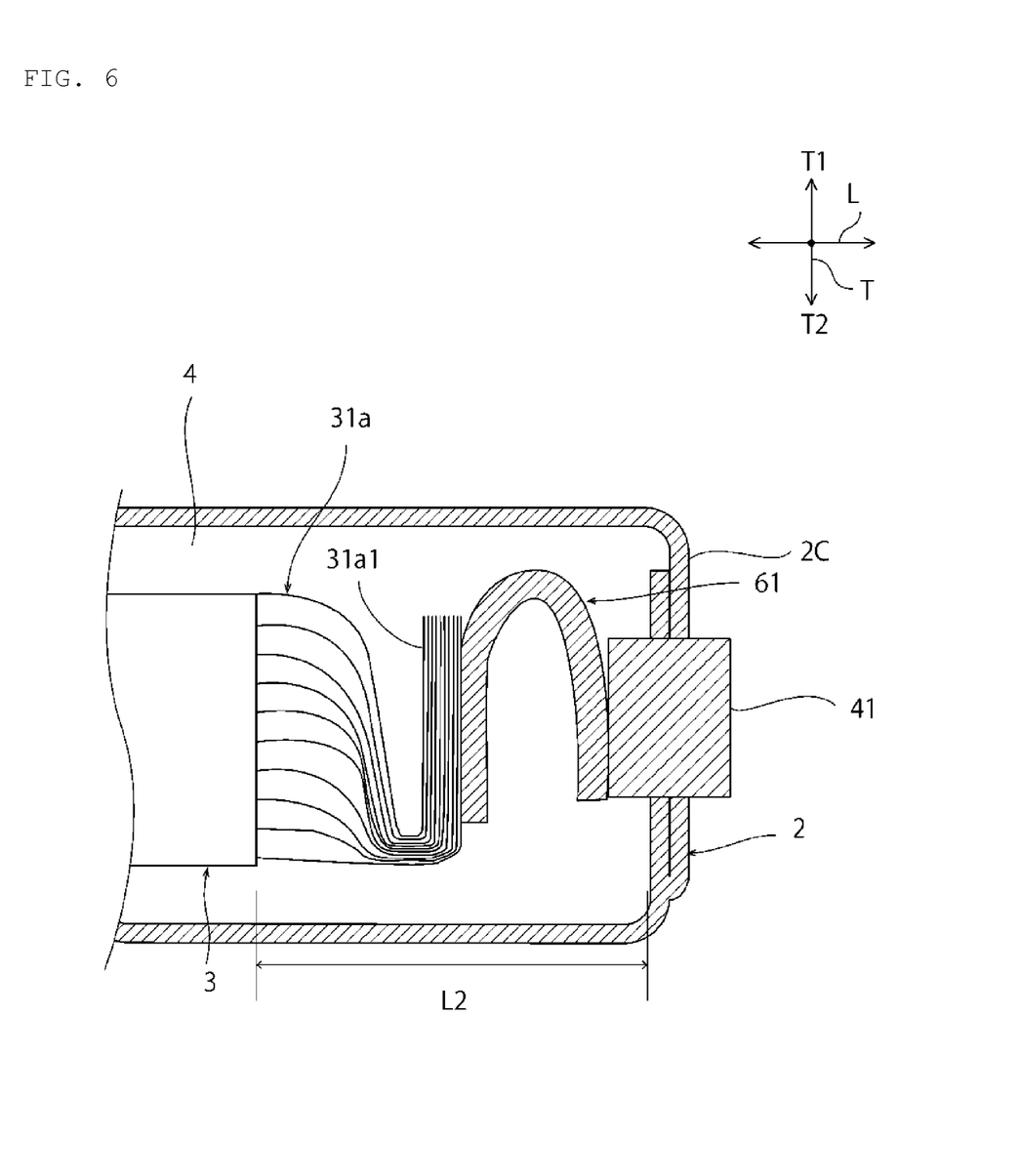
FIG. 6 is a schematic cross-sectional view of part of an electric storage device according to a comparative example.

In the electric storage device 1, the first and second leads 31*a* and 32*a* are connected with the second and fourth parts 81*b* and 82*b*, respectively, extending along the second main wall part 2B. This is an improvement over the comparative structure shown in FIG. 6, where there is a need to provide each of the leads 31*a* with the leading end part 31*a*1 extending along the thickness direction T beside the electrode body 3 and connect the leading end part 31*a*1 with the terminal 41 through a connection member 61. As a result, a distance L1 (FIGS. 4 and 5) between the side wall part 2C of the case 2 and the electrode body 3 in the electric storage device 1 can be shorter than a distance L2 between the side wall part 2C of the case 2 and the electrode body 3 in the electric storage device provided with the lead 31*a* including the leading end part 31*a*1 extending along the thickness direction T as exemplarily illustrated in FIG. 6. Thus, the occupation area of the first and second leads 31*a* and 32*a* in the case 2 can be reduced and the size of the electrode body 3 (for a given size case) can be increased. As a result, the electric storage device 1 having large capacity can be achieved.

Because the electrode body 3 and the case 2 of the present embodiment are joined together the possibility that there will be displacement of the electrode body 3 relative to the case 2 (and collision between the electrode body 3 and the case 2) is reduced. This also reduces the required clearance between the electrode body 3 and the case 2 with the result that the size of the electrode body 3, relative to the case, can be further increased. As a result, the electric storage device 1 having further large capacity can be achieved.

As illustrated in FIGS. 1 and 2, in the electric storage device 1, at least one of the positive electrode terminal 41 and the negative electrode terminal 42 is provided at the side wall part 2C1 forming the cutout part 2a at the side wall part 2C of the case 2. This configuration enables, for example, direct connection with another electronic component disposed at the cutout part 2a of the case 2, and reduction of the length of a connection member for connection with another electronic component. Thus, the occupation area of a connection member in an electronic device can be reduced, and the size of the electric storage device 1 can be increased accordingly. As a result, the size of the electrode body 3 can be increased. As a result, the electric storage device 1 having further large capacity can be achieved.

In the present embodiment the first and second electrode terminals are each provided as separate components from the case. However, the present invention is not limited to this configuration. For example, one of the first and second electrode terminals may be formed as part of the case.

In the present invention, the shape and structure of the separators are not particularly limited as long as the separators insulate its associated positive/negative electrode pair from each other. The separator may be provided in, for example, a zigzag (serpentine) shape.

Other exemplary preferable embodiments of the present invention will now be described. In the following description, a component having a function effectively identical to that in the above-described first embodiment will be denoted by an identical reference sign, and description thereof will be omitted.

Second Embodiment

Figure 7:
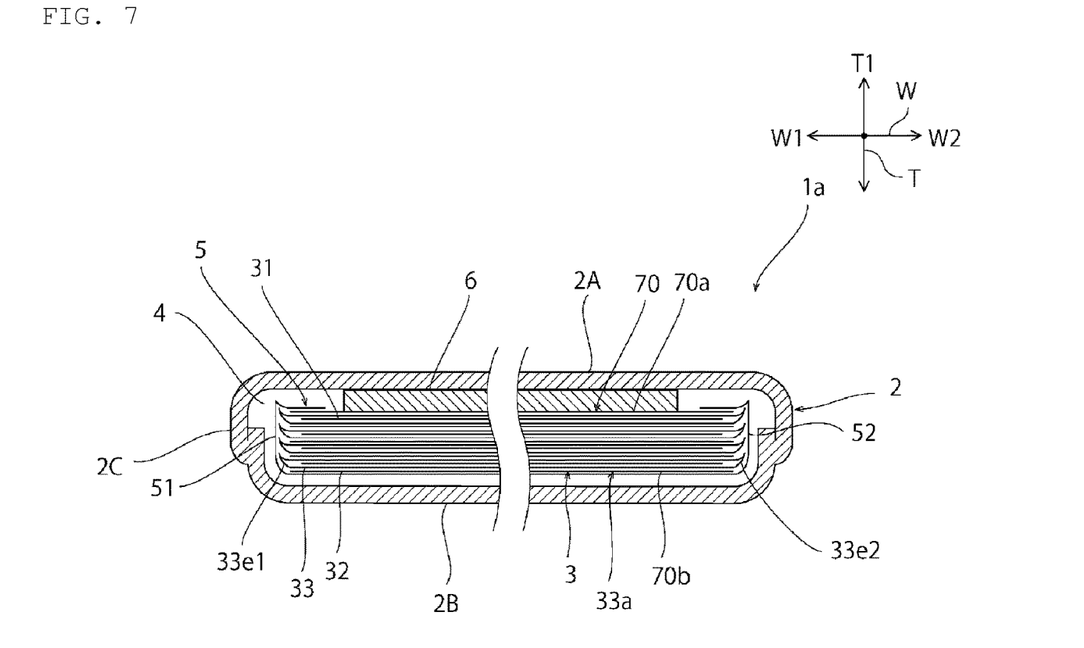
FIG. 7 is a schematic cross-sectional view of an electric storage device according to a second embodiment.

FIG. 7 is a schematic cross-sectional view of an electric storage device 1a according to a second embodiment.

This embodiment is identical to the first embodiment except that a single insulation tape 5 is used in lieu of the pair of insulation tapes 51 and. In this embodiment, the first and second insulation tapes 51 and 52 are connected together to form a single tape. In this case, the number of components included in the electric storage device 1a can be reduced.

Third Embodiment

Figure 8:
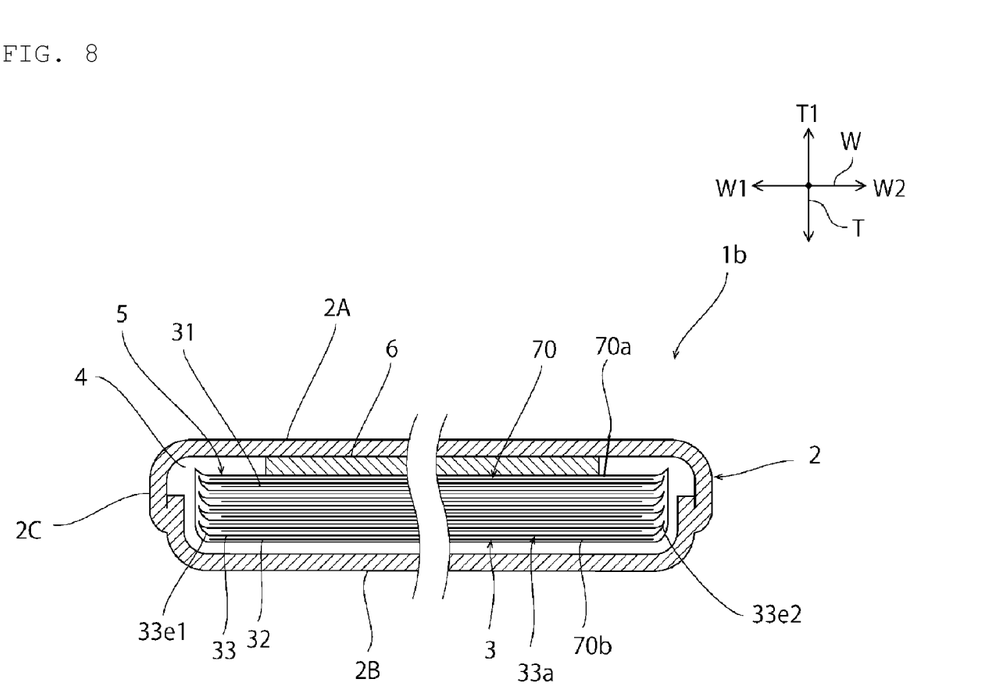
FIG. 8 is a schematic cross-sectional view of an electric storage device according to a third embodiment.

FIG. 8 is a schematic cross-sectional view of an electric storage device 1b according to a third embodiment.

In this embodiment, the single insulation tape 5 is wound around the laminated body 70 (i.e. it extends across the entire width W of the first and second main surfaces 70a and 70b and across the entire thickness of the left and right sides of the laminated body 70).

Other Embodiments

In the first embodiment, the electric storage device including the case in a rectangular shape including the cutout part in plan view. However, the present invention is not limited to this configuration. In the present invention, the shape of the case is not particularly limited. The case may have, for example, a rectangular parallelepiped shape, or a substantially rectangular parallelepiped shape as a rectangular shape with rounded corners in plan view.

DESCRIPTION OF REFERENCE SYMBOLS 1, 1a, 1b: Electric storage device
2: Case
2a: Cutout part
2A: First main wall part
2B: Second main wall part
2C: Side wall part
2C1: Side wall part forming cutout part
3: Electrode body
4: Electrolyte
5: Insulation tape
6: Bonding layer
31: Positive electrode
31a: First lead
31a1: Leading end part of first lead
32: Negative electrode
32a: Second lead
32a1: Leading end part of second lead
33: Separator
33a: Bag-shaped separator
33e1: First end part
33e2: Second end part
41: Positive electrode terminal
42: Negative electrode terminal
51: First insulation tape
52: Second insulation tape
61: Connection member
70: Laminated body
70a: First main surface
70b: Second main surface
81: First connection member
81a: First part
81b: Second part
82: Second connection member
82a: Third part
82b: Fourth part
83: Insulation member
84: Insulation member

The invention claimed is:

1. An electric storage device comprising:
(a) a case including first and second opposed main walls and a side wall extending between the first and second main walls;
(b) an electrode body housed in the case and including a first electrode, a second electrode, and a separator disposed between the first and second electrodes;
(c) first and second terminals located on the side wall of the case;
(d) a first lead electrically connected with the first electrode and extending from a side surface of the electrode body;
(e) a second lead electrically connected with the second electrode and extending from the side surface of the electrode body;
(f) a first connection member including a conductive part that has a first section facing the first main wall of the housing and a second section facing the side wall of the housing, the first lead being electrically connected with the first connection member, the first connection member being electrically coupled to the first terminal;

(g) a first insulation member which is electrically insulating and is located between both (i) the first section of the first connection member and the first main wall of the housing and (ii) the second section of the first connection member and the side wall of the housing;

(h) a second connection member including a conductive part that has a first section facing the first main wall of the housing and a second section facing the side wall of the housing, the second lead being electrically connected with the second connection member, the second connection member being electrically coupled to the second terminal; and (i) a second insulation member which is electrically insulating and is located between both (i) the first section of the second connection member and the first main wall of the housing and (ii) the second section of the second connection member and side wall of the housing.

2. The electric storage device according to claim 1, wherein the case has a rectangular shape including a cutout part as viewed along a plane running parallel to the first main wall of the case.

3. The electric storage device according to claim 1, wherein a portion of the side wall forms a cut out portion and at least one of the first and second terminals is provided on the portion of the side wall which forms the cutout part.

4. The electric storage device according to claim 1, wherein the case is made of a conductive material.

5. The electric storage device according to claim 1, wherein:
the first electrode, the second electrode, and the separator are integrated in the electrode body, and
the electrode body and the case are joined together.

6. The electric storage device according to claim 5, further comprising a bonding layer that bonds the electrode body to the case.

7. The electric storage device according to claim 1, wherein at least one of the first and second electrode terminals are formed as part of the case.

8. The electric storage device according to claim 1, wherein the first connection member is an L-shaped conductor.

9. The electric storage device according to claim 8, wherein the second connection member is an L-shaped conductor.

10. The electric storage device according to claim 1, wherein the electrode body comprises a plurality of sets of electrode pairs, each set of electrode pairs including respective first and second electrodes separated by a respective separator.

11. The electric storage device according to claim 10, wherein each of the first electrodes is electrically connected to a respective first lead and each of the second electrodes is electrically connected to a respective second lead, each of the first leads being electrically connected to the first terminal, each of the second leads being electrically connected to the second terminal.

12. The electric storage device according to claim 11, wherein each of the first leads is electrically connected to the first terminal via the first connection member and each of the second leads is electrically connected to the second terminal via the second connection member.

13. The electric storage device according to claim 1, wherein the electric body is planar and the first and second electrodes and the separator lie parallel to the plane of the electric body and are stacked in a direction perpendicular to the plane of the electric body.

\* \* \* \* \*